Figure 1:
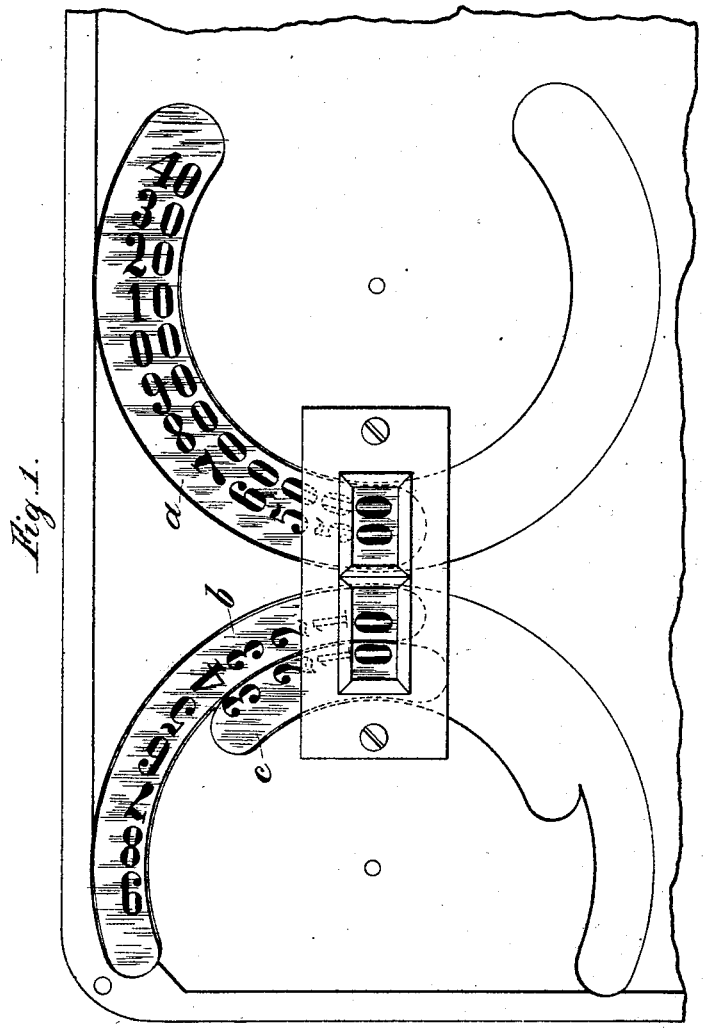

No. 718,259. PATENTED JAN. 13, 1903.
O. KUNTZEN & A. KAHLE.
FARE INDICATOR.
APPLICATION FILED APR. 25, 1902.
NO MODEL. 5 SHEETS—SHEET 1.

WITNESSES:

INVENTORS
OTTO KUNTZEN
AUGUST KAHLE
BY
Howson and Howson
THEIR ATTORNEYS.

No. 718,259. PATENTED JAN. 13, 1903.
O. KUNTZEN & A. KAHLE.
FARE INDICATOR.
APPLICATION FILED APR. 25, 1902.
NO MODEL.
5 SHEETS—SHEET 2.

WITNESSES:
F.W.Wright
Walter Abbz

INVENTORS
OTTO KUNTZEN.
AUGUST KAHLE
BY
Howson and Howson
THEIR ATTORNEYS

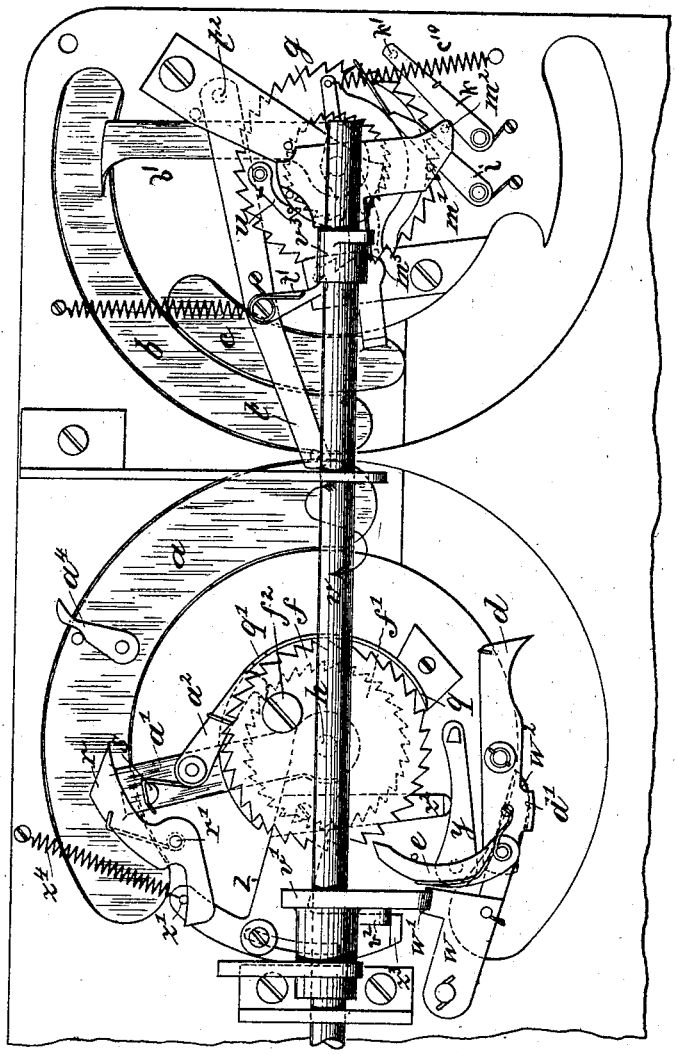

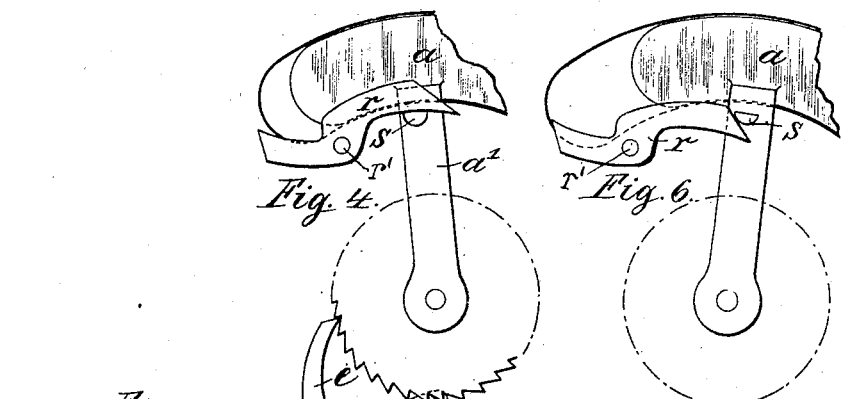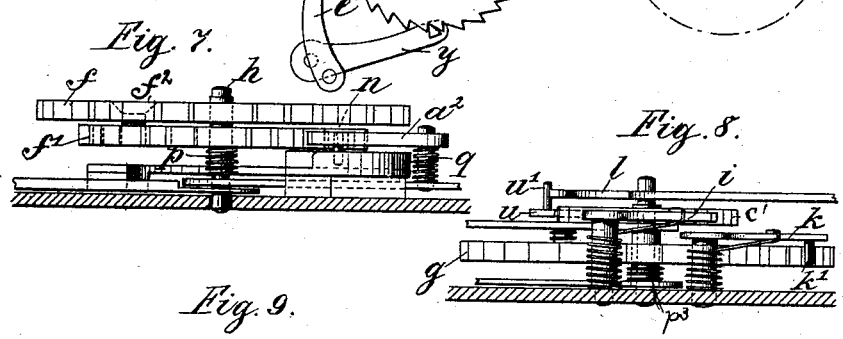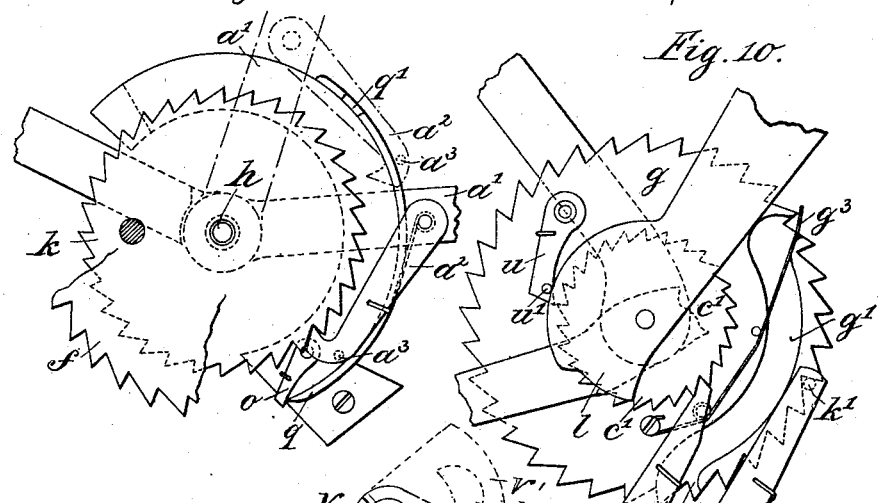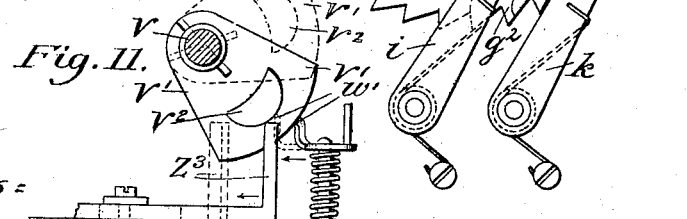

No. 718,259. PATENTED JAN. 13, 1903.
O. KUNTZEN & A. KAHLE.
FARE INDICATOR.
APPLICATION FILED APR. 25, 1902.
NO MODEL.
5 SHEETS—SHEET 5.
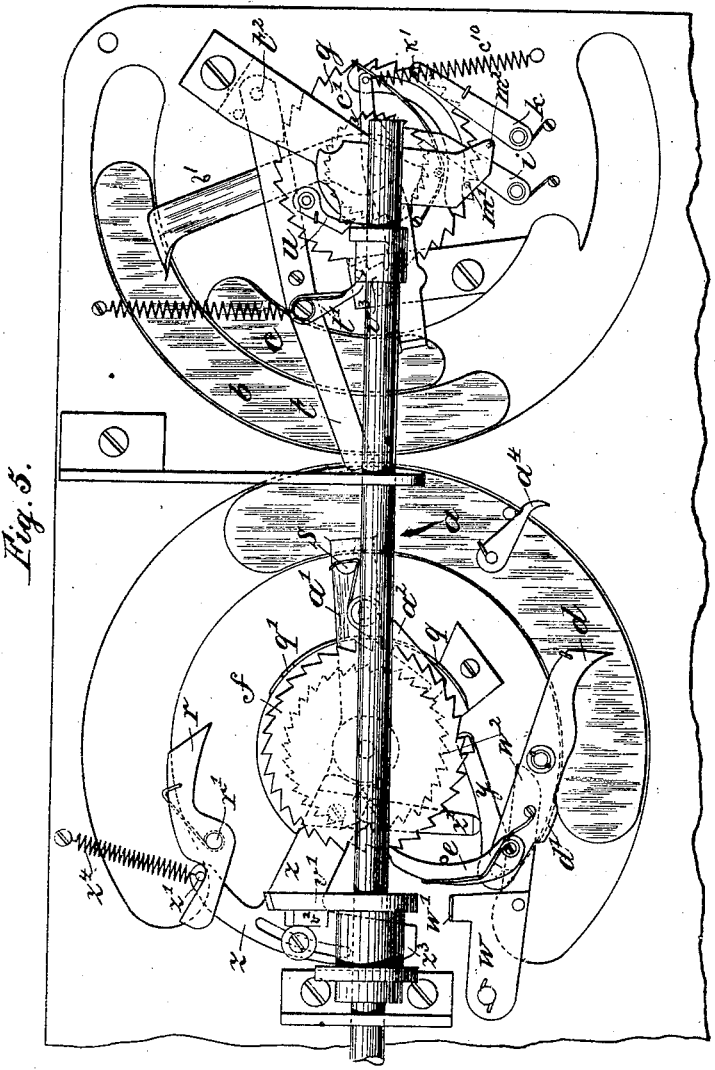
WITNESSES:
INVENTORS
OTTO KUNTZEN
AUGUST KAHLE
BY
THEIR ATTORNEYS

UNITED STATES PATENT OFFICE.

OTTO KUNTZEN AND AUGUST KAHLE, OF BERLIN, GERMANY.

FARE-INDICATOR.

SPECIFICATION forming part of Letters Patent No. 718,259, dated January 13, 1903.

Application filed April 25, 1902. Serial No. 104,710. (No model.)

*To all whom it may concern:*

Be it known that we, OTTO KUNTZEN and AUGUST KAHLE, subjects of the German Emperor, and residents of Berlin, Germany, have invented Improvements in Fare-Indicators, of which the following is a specification.

This invention has for its object to provide an improved fare-indicating mechanism for cabs or the like, and particularly one adapted for use where the custom is to charge a primary rate of fare for all distances within a certain basic limit and to indicate such primary fare on the face of the indicator at all times until said basic distance has been traveled and then to successively indicate totals, advancing as farther secondary distances are traversed, more particularly distances that are a multiple of the primary basic distance for which the basic charge has been indicated and for which secondary distance a different rate of fare is generally charged. This will of course vary with what constitutes the basic distance selected and what constitutes the certain primary rate charged therefor and will therefore generally vary according to the custom of the place where the indicator is to be used. By way of example, we would state that in Berlin, Germany, fifty pfennigs (primary rate) are charged for eight hundred meters, (basic distance,) while ten pfennigs (secondary rate) are charged for each additional four hundred meters, (secondary distance.)

Heretofore special means have been provided whereby the mechanism which advances or feeds the indicating means may be set out of action while the basic distance is being traversed, and then such feed mechanism is put into operation when the basic distance has been traversed. These special means for throwing the feed mechanism out of and into action are troublesome and liable to lead to mistakes.

By our invention the need of stopping the feed of the indicator while the basic distance is being traversed is entirely avoided. This object we accomplish by providing a regular intermittent feed for the indicator-face and repeating the basic rate indication on the indicator-face as many times as the basic distance is a multiple of the secondary distance. Thus in the case of the Berlin rates, the secondary distance (four hundred meters) being one-half the basic distance, (eight hundred meters,) the mechanism is constructed to feed the indicator forward once every four hundred meters, and the basic rate indication "50" therefore appears twice in succession on the indicator-face, thus "00," "50," "50," "60," "70," "80," "90," &c.

Our invention also consists of other features of construction hereinafter disclosed.

Figure 2:
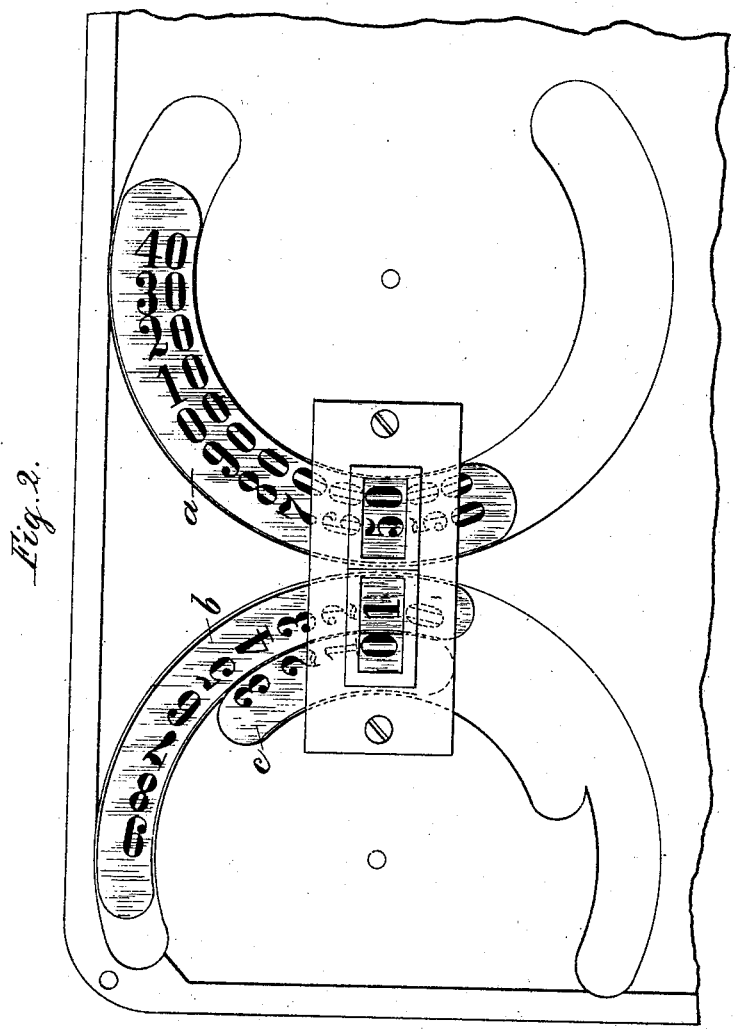

In the accompanying drawings, Figure 1 is a face view of part of an indicator, showing the disks before a fare has entered the cab, the indicator-face carrying "pfennig" and "mark" figures for the Berlin rates. By way of example, Fig. 2 is a similar view showing the position of the indicator when eighteen hundred meters have been traversed and a charge contracted of "M 1.50" pfennigs. Fig. 3 is a rear elevation of an indicator, showing the operating parts. Figs. 4 and 6 are side elevations of a detail for accomplishing the proper checking of the indicator-disk. Fig. 5 is a view similar to Fig. 3, but with the indicator-disks in another position. Fig. 7 is a partial sectional plan of the actuating mechanism for the pfennig-disk. Fig. 8 is a view of the marks-disk. Figs. 9 and 10 are side elevations of Figs. 7 and 8, respectively; and Fig. 11 is a partial view on the line 3 3, Fig. 3, showing the setting-cams.

The fare-indicator is provided with three semicircular disks $a$, $b$, and $c$, the first of which, $a$, indicates the pfennigs in the case illustrated, the second, $b$, the marks, and the third, $c$, the tens of marks. For convenience of reference we will speak of these indicator-faces as "disks." It is obvious in practice any other well-known form of indicator means may be employed. The indicator-disk $a$ has the figures "00," "50," "50," "60," "70," "80," "90," "00," "10," "20," "30," and "40" in succession on its face. The disk $a$ by means of an arm $a'$ is mounted to revolve on a pin $h$, secured to the face-plate of the indicator. A spring $p$, suitably secured to the pin and to the arm, tends always to return the disk to the position shown in Fig. 1. Two ratchet-wheels $f\ f'$, having oppositely-facing teeth, are secured together by a screw $f^2$ and are adapted to turn the arm $a'$ and disk $a$, as hereinafter described. The outer wheel $f$ is operated through a pawl $e$, secured on a pivoted arm $d$, operated by any well-known means, through a chain or the like, at given times, so as to advance the ratchet $f$ one tooth at every traverse of the vehicle equal to four hundred meters. The inner wheel $f'$ serves to advance the strip-arm $a'$ by means of a pawl $a^2$, secured to the arm $a'$, so that the arm and strip are normally advanced with the wheels. A safety catch-pawl $y$ normally prevents the spring $p$ from returning the disk $a$ and ratchet-wheel $f$ after the pawl has advanced them. A flange $q$, semicircularly arranged around the wheel $f'$ and having an opening $q'$ near its upper end and a spring-pressed pawl $o$ at its lower end, is suitably secured to the face-plate. (See Fig. 9.) When all the numerals of the disk $a$ up to and past "40" have been successively brought before the slit or opening in the face of the indicator, this pawl $o$ acts upon a pin $a^3$ on the pawl $a^2$, throws the pawl $a^2$ out of contact with the wheel $f'$, and also throws the pin $a^3$ to the outer periphery of the flange $q$, where it is retained out of contact with the wheel $f'$, which is thereupon returned toward its normal position by the spring $p$. When the pin $a^3$ comes opposite the opening $q'$ of the flange, it passes through the opening and again engages the wheel $f'$. The disk $a$, though moving toward its original position, has, however, been prevented from reaching that position and occupies the position of Fig. 2. This is accomplished by a detent device $r$.

A stud S is secured to the arm $a'$, and when the disk $a$ is in the position shown in Fig. 3 it is free and clear of a pivoted detent-lever $r$ by reason of such lever being moved on its pivot $r'$ against the action of spring $z^4$ by means hereinafter described; but when said lever is influenced by the spring alone, as it is at all times except when controlled by cams hereinafter described, the said stud S is stopped in the position of Figs. 3 and 6 by its coming into contact with the free end of the lever I, as will readily be understood. Upon the release of the spring from the position of Fig. 3 the detent $r$ will take up the position shown in Fig. 4, the disk, however, remaining in the position shown in Fig. 3. This does not prevent the freedom of movement of the disk until after the pin S has moved from under the detent $r$ and allowed it to fall and become a stop and insures the return of the disk $a$ from the numeral "40" to the second numeral "50" instead of to the first "50," as is obviously necessary when the indication passes beyond "1.40."

That the indicator may at will be set into and out of action we mount a cam-shaft $v$ in suitable bearings. This shaft carries a cam $v'$ and a cam projection $v^2$. On the pin $h$ we loosely mount a sector Z, having a pin Z' on one of its extending peripheral arms, to which is secured a spring $Z^4$. This pin Z' bears against the pivoted detent device $r$ and serves to move it against its spring at the proper times. The lower extending peripheral arm terminates in a cam-step $Z^3$, to be acted on by the projection $v^2$. The lever $d$ has an extending lip $d'$, on which the nose $W^2$ of a pivoted lever W is adapted to bear when said lever W is in the position shown in Fig. 3. This lever W has a cam-lip W', to be acted on by the cam $v'$. Secured to the sector Z near its center is a depending arm $Z^2$, adapted in its lower position to bear on and move the pawl $y$ out of contact with the ratchet-wheel $f$.

In order that the indicator-disk for pfennigs may serve to operate that for the marks, we secure a spring-pressed arm $a^4$ to the disk $a$ in such a position that it will operate a transfer-lever $t$ when "90" has passed the slit. This lever $t$ is pivoted at one end $t^2$ and carries a spring-pressed pawl $t'$, which engages with a ratchet-wheel $g$, mounted in the face-plate. A disk $b$ is secured to the ratchet-wheel by an arm $b'$. At each movement of the pawl $t'$ the wheel $g$ is advanced one tooth. A pawl $k$ prevents the return of the wheel, while a spring $p^3$, Fig. 8, tends to return it to zero. This ratchet-wheel $g$ has a channel $g^2$, Fig. 10, and a spring $g^3$ therein for a purpose hereinafter described. A second ratchet-wheel $c'$ is independently and loosely mounted, carrying the "tens-disk" $c$. A spring $c^{10}$ tends to keep this strip at zero, while a pawl $i$ normally prevents its return. A pawl $w$, having a pin $u'$ normally riding on a cam-plate $l$, is secured to the wheel $g$. This pawl is released from the cam-plate $l$ and caused to take into the teeth of the ratchet $c'$ and move it one tooth upon the last movement of the wheel $g$ prior to its return to zero. When the wheel $g$ has passed "9" and should return after actuating $c'$, a pin $k'$ on the pawl $k$ is brought opposite the groove $g^2$, into which it slides, and the pawl $k$ ceases to act as a check against the return of the wheel $g$ by its spring $p^3$ to its zero position. The spring $g^3$ forces the pawl-pin $k'$ out into position against the teeth of the wheel at the end of zero return movement, so that on the next movement of the wheel $g$ the pawl will again act as a check.

A centrally-pivoted plate $m$, having an extension $m^3$ and carrying pins $m'$ $m^2$, is adapted to be operated by a cam $v^3$ on the shaft $v$. This cam acts on the extension $m^3$ to cause the pins $m'$ $m^2$ to lift the pawls $k$ $i$ out of active position and allow the disks $b$ $c$ to be returned by the springs $p^3$ and $c^{10}$, respectively.

Assuming the disk $a$ to be in the position of Fig. 5 and that it is desired to place the indicator at zero, then the shaft $v$ is turned in the direction of the arrow, Fig. 3. First the cam $v'$ throws the lever $d$ and pawl $e$ out of action, and then the projection $u^2$ operates the sector, releasing the pawl $y$, lifting the detent $r$, and permitting the spring $p$ to return the disk and wheels to the position shown in Fig. 3. Upon a further movement of the cam-shaft the detent $r$ is dropped into the position shown in Fig. 4. The disk, however, does not occupy the position shown in that figure until a still further revolution of the shaft in setting the fare-indicator into action, which further movement will release the pawl e, and the pawl will by the tension of its spring revolve the wheel f one tooth upon coming into contact with it. This places the apparatus in working position, Fig. 4, with the first "50" before the slit. As each distance—say four hundred meters—is traversed the disk is advanced one numeral until "1.40" is reached. When, as before described, the next distance of four hundred meters is traversed, the disk is automatically returned to the second "50" (making the reading "1.50") by reason of the detent r then occupying the position shown in Fig. 6.

We claim as our invention—

1. A fare-indicator adapted to indicate and totalize a primary rate for a given basic distance, and secondary rates for secondary distances, said indicator having an indicator-disk with numerals thereon to indicate the basic rate, repeated as many times as the basic distance is a multiple of each secondary distance, and higher numerals increasing with the secondary units traversed and means for advancing said disk intermittently as the distance is covered, as and for the purpose described.

2. A fare-indicator having a disk to indicate fares and means to operate said disk having a number of succeeding numerals to indicate a basic rate for a basic distance repeated, the succeeding numerals being arranged in rising scale, substantially as described.

3. A fare-indicator having a disk to indicate fares, means for advancing the disk a given distance for each given distance traversed, said disk having duplicate numerals in succession and also succeeding numerals arranged in rising scale, in combination with automatic means to release the disk and return it toward its original position when its travel has been completed and automatic means to prevent the disk returning to the first basic rate-numeral but to stop it at the last basic rate-numeral, as and for the purpose described.

4. A fare-indicator having a disk to indicate fares, said disk carrying duplicate numerals succeeding each other on part of the disk and numerals in rising scale following them, means for advancing the disk, automatic means for returning it when it has completed its travel, automatic means for limiting such return movement and hand-operated means to control the automatic means to return the disk to initial position, as described.

5. A fare-indicator having an indicating-disk, means for advancing it, a detent r adapted to be operated by the primary advance of the disk and adapted to prevent its return to its original position and automatic means to return the disk after its extent of advance to the position regulated for it by the detent, substantially as described.

6. A fare-indicator having an indicating-disk, a pawl on the disk, a ratchet-wheel to advance the disk through the pawl, a flange, means for automatically releasing the pawl from the ratchet at the travel limit of the disk and cause the pawl to be retained in such released position outside the flange, means to return the disk and means to release the pawl from the flange upon the return of the disk to cause it to take into the ratchet-wheel again, substantially as described.

7. A fare-indicator having an indicating-disk, a pawl on the disk, a ratchet-wheel, means for advancing the ratchet-wheel, a flange, a spring-pawl at the terminus of the flange adapted to release the pawl of the disk from the teeth of the ratchet, an opening in the flange to release the pawl from the flange and means to return the disk toward its original position upon the release of the pawl, substantially as described.

8. A fare-indicator having an indicating-disk, a ratchet-wheel and pawl to advance it, a second ratchet to advance the first and a pawl e for operating it, a loosely-mounted spring-controlled sector, a safety-pawl y and means for operating the sector against its spring to release the ratchet-wheels, and means for returning the wheels, and disk toward their initial positions, substantially as described.

9. A fare-indicator having an indicating-disk, a stop on the latter, a spring tending to keep the disk in initial position, a ratchet-wheel to advance the disk, a safety-pawl y and a pawl e to advance the wheel in combination with a loosely-mounted spring-controlled sector, a detent-lever r and means for operating the sector against its spring, said sector when so operated being adapted to release the pawls e and y and permit the disk to be returned to initial position by its spring, substantially as described.

In testimony whereof we have signed our names to this specification in the presence of the subscribing witnesses.

OTTO KUNTZEN.
AUGUST KAHLE.

Witnesses:
 DEAN B. MASON,
 FRANK H. MASON,
 DORA FRAU KAHLE.